United States Patent [19]

Carter et al.

[11] 4,231,426

[45] Nov. 4, 1980

[54] METHOD OF USING TRACER FLUIDS FOR ENHANCED OIL RECOVERY

[75] Inventors: Walter H. Carter, Houston; Jerry L. Sides, Stafford, both of Tex.

[73] Assignee: Texaco Inc., White Plains, N.Y.

[21] Appl. No.: 37,588

[22] Filed: May 9, 1979

[51] Int. Cl.$^2$ .................... E21B 43/22; E21B 47/00
[52] U.S. Cl. .................................. 166/252; 166/275
[58] Field of Search .............. 166/250, 252, 273, 274, 166/275

[56] References Cited

U.S. PATENT DOCUMENTS

| | | | |
|---|---|---|---|
| 3,141,818 | 7/1964 | Stephens et al. | 252/8.55 D X |
| 3,160,205 | 12/1964 | Harvey et al. | 252/8.55 D X |
| 3,206,398 | 9/1965 | Marlowe et al. | 252/8.55 D |
| 3,329,610 | 7/1967 | Kreuz et al. | 166/275 |
| 3,415,936 | 12/1968 | Hitzman | 252/8.55 D X |
| 3,590,923 | 7/1971 | Cooke, Jr. | 166/252 |
| 3,854,532 | 12/1974 | Braden, Jr. | 166/274 |
| 3,868,999 | 3/1975 | Christopher, Jr. et al. | 166/305 R X |
| 3,956,145 | 5/1976 | Christopher, Jr. et al. | 166/275 X |
| 4,055,399 | 10/1977 | Parrish | 166/252 X |
| 4,085,798 | 4/1978 | Schweitzer et al. | 166/252 |

*Primary Examiner*—John E. Murtagh
*Assistant Examiner*—George A. Suchfield
*Attorney, Agent, or Firm*—Carl G. Ries; Robert A. Kulason; Jack H. Park

[57] ABSTRACT

Disclosed is a tracer fluid for use in connection with surfactant waterflooding or other chemicalized enhanced oil recovery processes, and an oil recovery process using the fluid. Fluids containing easily identifiable components such as water-soluble, inorganic salts, specifically water-soluble nitrate salts, as well as low molecular weight alcohols may be used as tracer fluids for determining numerous flow and formation conditions between injection wells and production wells. Many of the most desirable tracers are degraded by bacteria present in field water or surface contamination. Incorporation of from 10 to 2000 and preferably from 50 to 1500 parts per million of an aromatic treating compound, preferably benzene, toluene, or xylene, stabilizes the chemical tracer against microbial attack.

16 Claims, No Drawings

METHOD OF USING TRACER FLUIDS FOR ENHANCED OIL RECOVERY

FIELD OF THE INVENTION

This invention concerns a tracer fluid and method employed in a chemicalized enhanced oil recovery process. More specifically, the invention is concerned with a microbially stable fluid which can be used as a tracer in connection with surfactant waterflooding or other chemical flooding enhanced oil recovery methods.

BACKGROUND OF THE INVENTION

In recovering oil from subterranean deposits thereof, it is well recognized by persons skilled in the art and in the literature pertaining to oil recovery operations, that only a small percentage of the total oil present in these reservoirs is recovered by so called primary means, i.e., by employing natural drive energy present in the reservoir in the form of an underlying or edge water drive, gas cap or solution gas drive, etc. Even after application of waterflooding, commonly referred so as "secondary recovery," as much as half or more of the oil originally present in the reservoir remains in the reservoir.

Many prior art references describe the use of surfactant waterflood oil recovery methods for the purpose of increasing the amount of oil displaced by a drive fluid passing through a flow channel in a reservoir. Inclusion of surfactants or interfacial tension-reducing chemicals in the injected water achieves recovery from small capillaries and/or dead-end pore spaces not invaded by ordinary drive water, and so recovers additional oil from the reservoirs over that obtainable by waterflood. Petroleum sulfonates and other organic sulfonates, as well as more complex surfactants including alkyl- or alkylarylpolyethoxy sulfates and sulfonates have been disclosed in numerous prior art references for recovering additional amounts of oil over that recoverable by primary and secondary recovery techniques.

State-of-the-art surfactant waterflooding enhanced oil recovery methods frequently make use of a tracer fluid injected into one or more injection wells, whose presence can be easily detected in fluids being recovered from spaced-apart production wells. In employing tracer fluids in connection with surfactant waterflood oil recovery processes, the first measurement involves the arrival time, i.e., the elapsed time between injection of the fluid into the injection well and the time when the fluid containing the tracer material first arrives at one or more spaced-apart production wells. Simple qualitative analysis is adequate for determining the time when the fluid first arrives, and from this arrival time one can determine the volume of reservoir through which the injected fluid passes. This is one of the most important parameters which can be determined by use of tracer fluids, since it directly affects the amount of surfactant fluid which must be employed in a particular pattern, and aids in predicting the amount of additional oil one can expect from application of the enhanced oil recovery method. Once the fluid containing the tracer material has been detected at the production well, the more sophisticated techniques for monitoring and analyzing enhanced oil recovery processes require that the concentration of tracer material in the produced fluid be measured continually or intermittently over a period of time so the shape of the response curve (concentration versus time or fluid volume produced) can be determined.

Other uses for tracer fluids in connection with surfactant flooding or other enhanced oil recovery processes, include the ability to detect flow aberrations caused by pressure differentials in the reservoir created by factors other than the injection of enhanced recovery fluids, which distorts the pattern performance. The data obtained from tracer slugs employed before and/or with the surfactant fluid can also be relied on to explain and analyze results of a pilot field trial.

Tracers suitable for use in enhanced oil recovery must meet a number of requirements. They should be relatively inexpensive, and must be compatible with fluids naturally present in the reservoir and with the reservoir rock itself, as well as with fluids injected into the reservoir in connection with the enhanced oil recovery process. Moreover, the tracer material must be one which can be readily detected qualitatively and analyzed quantitatively in the presence of the materials naturally occurring in the formation fluids. For example, an aqueous sodium chloride solution could be utilized as a tracer but for the fact that most field brines contain sodium chloride in substantial quantities, and so detection and analysis of sodium chloride used as a tracer in the presence of naturally-occurring sodium chloride would be difficult.

Another requirement is that the tracer not be readily absorbed or otherwise removed from the tracer fluid, since more sophisticated analytical techniques require that the concentration of tracer material in the produced fluids be determined and compared with the concentration of tracer in the fluid injected into the injection well.

A serious problem has been encountered in the use of many tracers which are otherwise quite suitable, in that bacteria introduced into the fluid containing the tracer as a result of contamination during surface handling, or which naturally occur in oil field brines, attack and decompose the tracer materials. Since the tracer materials will be in the formation for relatively long periods of time, i.e., many months or even several years, it is essential that the tracer material be stable over relatively long periods of time at the temperature and other conditions existing in the petroleum reservoir.

In view of the foregoing discussion, it can be appreciated that there is a serious need for a method or additive for stabilizing tracer fluids against bacterial degradation. Ideally, the stabilizing additive should be one which is relatively inexpensive, and which is highly effective and long lasting in order to maintain the concentration of tracer material in the tracer fluid constant over long periods of time. Moreover, the additive must not interfere with analysis of the tracer material, and the stabilizing additive must not interfere or degrade the effectiveness of chemicals injected into the reservoir for the purpose of surfactant waterflooding enhanced oil recovery.

It is an object of this invention to provide an effective stabilizing additive for use in tracer fluids, and this objective is met in at least certain of the preferred embodiments to be described hereinafter below.

SUMMARY OF THE INVENTION

The present invention concerns a novel tracer fluid and a method employing the fluid for determining flow conditions between spaced-apart wells penetrating and in fluid communication with a subterranean oil-containing formation, by a method comprising injecting an aqueous fluid containing a known concentration of a tracer material whose presence and concentration can be analyzed effectively in the produced fluid, which tracer material is seriously degraded by bacterial attack as a result of being in contact with bacteria over long periods of time. The invention is concerned with a method for stabilizing the tracer fluid against bacterial attack by incorporating in it from 10 to 2000 and preferably from 50 to 1500 parts per million of an aromatic treating compound. The preferred aromatic treating compound is benzene, toluene, xylene or short chain alkyl-substituted benzene or toluene.

DESCRIPTION OF THE PREFERRED EMBODIMENTS

This invention concerns an improved tracer fluid for use in connection with surfactant waterflood oil recovery methods, and a tracer method for conducting studies in conjunction with surfactant waterflooding oil recovery processes employing the tracer fluid.

In surfactant waterflooding, it is essential that as much information as possible concerning the reservoir and flow properties existing in the portion of the formation between the injection well and production well be determined. One technique which has been at least partially successful, comprises injecting a fluid containing a tracer material into one or more injection wells, displacing the fluid through the formation by a suitable drive fluid such as water or brine, and determining the elapsed time between initiating injecting the tracer into the formation and the time of arrival of the fluid at each production well being monitored. Once production of tracer begins, it is also preferable to measure the concentration of tracer in the produced fluid on a continuous or intermittent basis so long as fluid containing the tracer is being produced, so the shape of a response curve (concentration versus time) can be determined.

The most significant use of tracer fluids and processes employing the fluids is concerned with a determination of the volume of reservoir through which the fluid passes. In designing a surfactant waterflood, one employing modern reservoir engineering techniques can estimate the volume of reservoir through which the injected fluid will pass, and so can determine the amount of additional oil which may be recovered as a consequence of injecting a surfactant or other enhanced oil recovery fluid as well as the volume of surfactant fluid which must be injected into the reservoir. An accurate determination of the actual volume needed by use of tracer studies will avoid using excessive amounts of surfactant fluid, which would be wasteful, or using too little surfactant fluid, which would result in poor oil recovery effectiveness.

If the volume of reservoir through which the injected fluid passes, as indicated by early arrival of the fluid, is substantially less than expected, it may be necessary to conduct additional tests to determine whether the failure of the fluid to pass through as much reservoir volume as predicted was caused by the occurrence of a high permeability thief zone within the reservoir, causing most of the injected fluid to pass through a small portion of the total thickness of the reservoir, or if other factors are present. Another factor which has an adverse effect on chemical flooding, which can be detected by tracer studies is the presence of flow aberrations, such as may occur if a pressure differential exists across the pattern due to factors other than the enhanced oil recovery process being applied to the pattern. This phenomenon may occur in a field in which wells outside the pattern being used for enhanced oil recovery are being subjected to waterflood techniques, or it may be due to the presence of a natural edge water drive, which causes fluids to be moved in a direction other than directly between an injection well and production well within an enhanced oil recovery pilot pattern.

It is also known that the tracer material may be incorporated in the surfactant fluid or polymer fluid rather than in a separate tracer fluid. It should be understood that the disclosure herein applies equally to incorporating the tracer and from 10 to 2000 parts per million of the aromatic treating material in the surfactant fluid, or the polymer fluid, or in both the surfactant and polymer fluids.

Numerous materials can be employed as tracers for the purpose of obtaining additional information about the volume of formation through which the fluid passes, as well as other factors described above. A suitable tracer must be one which is relatively inexpensive and stable in the reservoir at conditions existing in the reservoir over long periods of time. The tracer must also be compatible with naturally occurring fluids and with fluids injected into the reservoir during the course of an enhanced oil recovery process. The tracer material should be relatively inexpensive, since it does not itself stimulate production of additional oil from the reservoir, and its cost is added to the cost of surfactants and other fluids employed in the enhanced oil recovery process. Finally, the material must be one whose presence can be detected, and preferably the concentration determined, by relatively inexpensive and straight forward methods.

One group of tracers which are generally effective and meet all of the above described criteria except one, are water-soluble, inorganic nitrate salts, such as sodium nitrate, lithium nitrate, potassium nitrate, or ammonium nitrate. These salts are readily detected over ions normally present in formation brines, are easily analyzed quantitatively, and do not cause interference with naturally-occurring materials or with most surfactants employed in surfactant waterflooding oil recovery processes. It has been determined, however, that water-soluble nitrate salts are degraded by contact with bacteria present in oil field brines. The effect of the degradation by bacteria is to decrease the concentration of the nitrate salts in a tracer fluid, and thus give erroneous analytical results when the tracer fluid is analyzed for water-soluble nitrate salt content. Although there are bactericides commercially available for this purpose, they are relatively expensive and not always entirely satisfactory.

Another class of compounds which can be used for tracer studies, and which, like the water-soluble nitrates described above, meet all the criteria for successful use as tracers except for a susceptibility to biological degradation in the formation, are short chain alcohols. Specifically, short chain aliphatic alcohols, preferably alkanols, e.g. those having from 1 to 5 preferably from 1 to 3 carbon atoms, are suitable for use as tracers except for the fact that they are degraded by contact with naturally occurring bacteria in the formation brines.

We have discovered that the sensitivity of the foregoing tracer materials to bacterial degradation can be avoided by incorporating in the tracer fluid, an effective amount of an aromatic treating compound having the following formula:

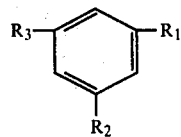

where $R_1$, $R_2$ and $R_3$ are each hydrogen, methyl or a $C_2$ to $C_5$ and preferably $C_2$ to $C_3$ alkyl with the total number of carbon atoms in $R_1$, $R_2$ and $R_3$ being from 0 to 5 and preferably from 0 to 3. The preferred species include the following: benzene, toluene, xylene, ethyl benzene, ethyl toluene, propyl benzene, propyl toluene, butyl benzene and butyl toluene.

The especially preferred embodiment is toluene because of its low toxicity, high effectiveness, widespread availability and relatively low cost.

In applying the process of our invention, the optimum concentration of the above described aromatic treating compound should be determined using the tracer of choice in an actual sample of oil field brine in which the tracer fluid is to be prepared. Time kill studies should be conducted using various concentrations of the aromatic treating compound in combination with the concentration of tracer to be employed in the field trial, to determine the minimum amount of aromatic treating compound which effectively protects the tracer against microbial attack under simulated formation conditions for a period of time equivalent to the anticipated formation dwell time of the tracer. The tracer fluid injected into the formation should then contain at least this minimum amount of additive sufficient to prevent macrobial degradation. Slight excess of the aromatic treating compound may be incorporated in the tracer to ensure a satisfactory safety margin for field operations. It should be understood, however, that incorporation of the aromatic treating compound in substantially greater concentrations than that determined in the foregoing tests will not substantially improve the performance of the tracer fluid and will increase the cost of the tracer study portion of the enhanced oil recovery process. It should also be understood that many of the above-described aromatic compounds have limited solubility in water. The amount of the aromatic compound incorporated in the fluid can exceed the solubility, with the excess being dispersed or emulsified, provided no adverse interactions or fluid handling problems exist. The use of an excess may be operationally advantageous, since some loss of aromatic compound may occur in the formation, and the presence of excess dispersed aromatic material ensures that sufficient material remains to maintain bactericidal procection of the tracer.

Subject to the foregoing recommendation of actual determination of minimal concentration, the concentration of the aromatic treating compound employed in the fluid will ordinarily be from 10 to 2000 and preferably from 50 to 1500 parts per million (0.01 to 2.0 and preferably from 0.05 to 1.5 kilograms/meter$^3$).

For the purpose of illustrating how this invention is applied in connection with a surfactant waterflood oil recovery method, the following pilot field example is described. This is furnished only for the purpose of making a complete disclosure of this invention, however, and is not intended to be in any way restrictive thereof.

A single five-spot pattern comprising a central injection well and four producing wells, each located on the corner of a square which is 100 feet on a side, is employed. The wells are in fluid communication with a reservoir whose thickness is 37 feet, the permeability of the reservoir being 75 millidarcies and the porosity being 35 percent. Under the best conditions, it is known that the volumetric efficiency of a displacement process applied to such a formation, due to less than perfect horizontal and vertical conformance, is approximately 70 percent. Accordingly, the maximum pore volume of formation which one would expect to contact by injecting the fluid into the injection well in the above described pilot example, would be:

$$100 \times 100 \times 37 \times 0.35 \times 0.70 = 90{,}650 \text{ cubic feet.}$$

It is determined for the purpose of the surfactant waterflood, to use a 20 pore volume percent slug of surfactant, which is:

$$0.2 \times 90{,}650 \times 7.481 = 135{,}600 \text{ gallons.}$$

As part of the tracer slug study, to evaluate the volume of formation to be contacted by injected fluid, and hence the volume of surfactant and other fluids required, it is determined to inject a 10 pore volume percent slug of tracer fluid. The particular tracer to be employed is sodium nitrate, and is determined that a satisfactory concentration of sodium nitrate in the tracer is 500 parts per million.

Samples containing 500 parts per million sodium nitrate are prepared in formation brine, and it is determined that bacteria in the formation brine decrease the concentration of nitrate in the brine by approximately 15 percent over a period of 6 weeks, indicating that some stabilization of the fluid is required. Another series of samples containing varying concentrations of toluene (in addition to sodium nitrate) are prepared, and it is determined that effective stabilization of nitrate against macrobial decomposition is obtained if the fluid contains at least 1000 parts per million toluene. It is determined to use a 10 percent excess of toluene, and so the final tracer fluid injected into the injection well is a 10 pore volume percent slug, or 67,800 gallons, containing 500 parts per million nitrate and 1100 parts per million toluene. After the fluid has been injected into the central injection well and displaced away from that well by field brine, the tracer arrival time at each of the production wells as well as the tracer concentration contour of produced fluid is readily determined and the stability of the tracer fluid against macrobial attack during the period that the tracer is in the formation is verified.

In a slightly different embodiment of this invention, the tracer is incorporated in the surfactant fluid or polymer fluid rather than in a separate fluid. The above described aromatic treating compound is included in the surfactant fluid, in the same concentration range as given above, to inhibit bacterial attack of the tracer.

EXPERIMENTAL SECTION

The first series of tests were conducted to determine whether bacterial degradation of sodium nitrate occurred in samples of field water from a proposed chemical enhanced oil recovery test occurred under laboratory conditions approximating that which would exist in the field trial.

The samples were prepared by mixing 1.00 grams of sodium nitrate in 2,000 cc of field injection water (prepared by mixing approximately equal amounts of fresh water and produced water from the formation being studied). One hundred cc samples of this solution was added to a number of individual bottles, whose treatment was as follows.

Sample 1 was a stock solution which was autoclaved at 260° F. and sealed.

Sample 2 was autoclaved and 1 cc of bacteria was added to the sample and sealed.

Sample 3 comprised the stock solution to which 1 cc of bacteria was added.

Sample 4 was prepared by adding 1 cc of bacteria and 1 cc of a 10,000 gram/meter$^3$ commercially available bacteriacide (Dowicide B ®).

Sample 5 comprised the stock solution sealed and not treated in any way.

In sample 6, 1 cc of Dowicide B ® was added to the stock solution and sealed.

All of these samples were aged for two weeks at 75° F. The sodium nitrate concentration reported in Table I below represents an average of three separate runs to ensure accuracy of the reported figures.

TABLE I

| NaNO$_3$ Concentration Changes in Samples Aged 14 Days At 75° F. | | |
|---|---|---|
| Sample Number | Sample | NaNO$_3$ Concentration gm/m$^3$ |
| 1 | Autoclaved solution | 348 |
| 2 | Autoclaved solution + bacteria | 342 |
| 3 | Stock solution + bacteria | 292 |
| 4 | Stock solution + bacteria + bactericide | 338 |
| 5 | Stock solution | 338 |
| 6 | Stock solution + bactericide | 335 |

In the above described tests, the bacteria added was a culture originally taken from produced fluid in the field, and represents about what would be encountered by an aqueous solution of sodium nitrate being injected into the formation.

Run 3 illustrates what would be experienced by a solution of sodium nitrate contacting bacteria present in the brine used to prepare the solution, if the fluid contained no bactericide. It can be seen that the nitrate concentration of 292 versus the concentration in Run 1 and 2, 348 and 342 respectively, illustrates approximately 13 percent of the sodium nitrate is lost in only a two-week period. Since substantially greater time intervals than this may be encountered in an ordinary field trail, it is evident that some stabilization is necessary. Autoclaving the solution of course, reduced the loss of sodium nitrate, but this cannot be duplicated under field conditions. Addition of the commercial bacteriacide to the stock solution as is illustrated in Run 6 and to the stock solution innoculated with bacteria, Run 4, illustrate that the commercial product reduces loss of nitrate from solution, although the treatment is quite expensive.

Another series of experiments were performed to further study the loss of sodium nitrate concentration with time. The samples were prepared as described above, except the starting concentration was about 477 grams/meter$^3$. The same types of samples were prepared, and concentration was determined initially, as well as after 2, 4 and 6 weeks aging at 75° F. The data are contained in Table II below.

TABLE II

| SODIUM NITRATE CONCENTRATION LOSSES | | | | |
|---|---|---|---|---|
| | NaNO$_3$ Concentration (g/m$^3$) | | | |
| Sample Description | Initial | After 2 weeks | After 4 weeks | After 6 weeks |
| 7 Stock solution plus field bacteria | 473 | 400 | 388 | 403 |
| 8 Stock solution + field bacteria + bacteriacide | 468 | 463 | 466 | 452 |

Sample 7 illustrated loss of concentration of the sample innoculated with bacteria, with most of the loss occurring after the first two week period. In Sample 8, the commercial bactericide was effective.

Another series of tests were conducted to determine if toluene would effectively reduce loss of sodium nitrate concentration in samples due to bacterial degradation. The samples involved in this test were prepared by first preparing a 1000 gram/meter$^3$ solution of sodium nitrate in injection water. The data are listed in Table III below. It can be seen in Sample 9, the initial concentration of 1040 parts per million sodium nitrate was decreased to about 1029 after aging for six weeks, a loss of only one percent. In Sample 10, 1000 parts per million toluene resulted in complete stabilization of the stock solution. Sample 11 comprised 1000 grams/meter$^3$ of toluene in a sample which had been innoculated with 1 cc of bacteria culture, and it can be seen that the stabilization over a six week period was nearly complete, since only about 1 percent of the sodium nitrate concentration was lost. This compares favorably with Run 3 in Table I and Run 7 in Table II, where stock solutions innoculated with bacteria experienced concentration losses of 15 and 13 percent respectively.

TABLE III

| EFFECTIVENESS OF TOLUENE AS BACTERIACIDE FOR NaNO$_3$ | | | | | | |
|---|---|---|---|---|---|---|
| Sample Number | Toluene | Bacteria Culture | NaNO$_3$ Concentration | | | |
| | | | Initial | 3 weeks | 6 weeks | % Loss |
| 9 | — | — | 1040 | 1028 | 1029 | 1.0 |
| 10 | 1000 | — | 1040 | 1021 | 1040 | 0 |
| 11 | 1000 | 1 cc | 1040 | 1010 | 1027 | 1 |

The foregoing data clearly illustrates that sodium nitrate is degraded bacterially under conditions such as would be experienced in this particular field trail, and that 1000 parts per million toluene is quite effective for preventing bacterial degradation of sodium nitrate concentration in a stock solution prepared in field water as well as in a stock solution prepared in field water and subsequently innoculated with bacteria culture from the particular field being studied.

While our invention has been described in terms of a number of illustrative embodiments, it is clearly not so limited, these being supplied only for the purpose of disclosure and identification of best mode of operation, since many variations thereof will be apparent to persons skilled in the art of enhanced oil recovery operations without departing from the true spirit and scope of our invention. It is our intention that our invention be limited and restricted only by those limitations and restrictions appearing in the claims appended immediately hereinafter below.

We claim:

1. In a method for determining flow conditions between spaced-apart wells penetrating and in fluid communication with the subterranean formation comprising injecting a predetermined quantity of an aqueous liquid having dissolved therein a known concentration of a tracer material subject to bacterial attack, wherein the improvement for reducing the rate of bacterial attack of the tracer comprises:

incorporating a bactericidially effective amount of an aromatic treating compound into the aqueous liquid containing the tracer.

2. A method as recited in claim 1 wherein the aromatic tracer solution has the following formula:

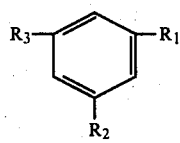

wherein $R_1$, $R_2$ and $R_3$ are each hydrogen, methyl or an alkyl having up to 5 carbon atoms, the total number of carbon atoms in $R_1$, $R_2$ and $R_3$ being from 0 to 5.

3. A method as recited in claim 2 wherein the aromatic treating agent comprises benzene, toluene, xylene, $C_2$ to $C_5$ alkyl substituted benzene, $C_2$ to $C_5$ alkyl substituted toluene, and mixtures thereof.

4. A method as recited in claim 3 wherein the aromatic treating agent is toluene.

5. A method as recited in claim 1 wherein the tracer is a water-soluble sodium nitrate, potassium nitrate, lithium nitrate, ammonium nitrate, or a mixture thereof.

6. A method as recited in claim 5 wherein the tracer is sodium nitrate.

7. A method as recited in claim 1 wherein the tracer is a $C_1$ to $C_5$ alcohol.

8. A method as recited in claim 7 wherein the tracer is a $C_1$ to $C_3$ alcohol.

9. A method as recited in claim 1 wherein the concentration of the aromatic treating agent is from 10 to 2000 parts per million.

10. A method as recited in claim 1 wherein the concentration of the aromatic treating agent is from 50 to 1500 parts per million.

11. In a method of recovering oil from a subterranean, petroleum-containing formation penetrated by an injection well and a production well, comprising injecting an aqueous, surfactant-containing fluid into the formation via the injection well to displace petroleum through the formation to the production well, from which it is recovered to the surface of the earth, said surfactant fluid containing a tracer amount of a tracer material which is susceptible to bacterial attack, wherein the improvement for inhibiting bacterial degradation of the tracer comprises:

incorporating in the surfactant and tracer containing fluid from 10 to 2000 parts per million of an aromatic compound having the following formula:

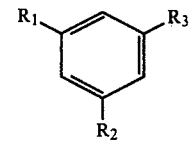

wherein $R_1$, $R_2$, and $R_3$ are each hydrogen, methyl or $C_2$ to $C_5$ alkyl, the total number of carbon atoms in $R_1$, $R_2$, and $R_3$ being from 0 to 5.

12. A method as recited in claim 11 wherein the tracer is sodium, potassium, lithium or ammonium nitrate.

13. A method as recited in claim 11 wherein the tracer is $C_1$ to $C_5$ alcohol.

14. In a method of recovering oil from a subterranean, petroleum-containing formation penetrated by an injection well and a production well, comprising injecting an aqueous, polymer-containing fluid into the formation via the injection well to displace petroleum through the formation to the production well, from which it is recovered to the surface of the earth, said polymer fluid containing a tracer amount of a tracer material which is susceptible to bacterial attack, wherein the improvement for inhibiting bacterial degradation of the tracer comprises:

incorporating in the polymer and tracer containing fluid from 10 to 2000 parts per million of an aromatic compound having the following formula:

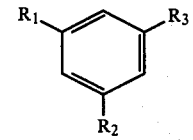

wherein $R_1$, $R_2$, and $R_3$ are each hydrogen, methyl or $C_2$ to $C_5$ alkly, the total number of carbon atoms in $R_1$, $R_2$, and $R_3$ being from 0 to 5.

15. A method as recited in claim 14 wherein the tracer is sodium, potassium, lithium or ammonium nitrate.

16. A method as recited in claim 14 wherein the tracer is a $C_1$ to $C_5$ alcohol.

* * * * *